Sept. 27, 1932.  J. HAMMERL  1,879,215
MOTOR VEHICLE
Filed June 28, 1929
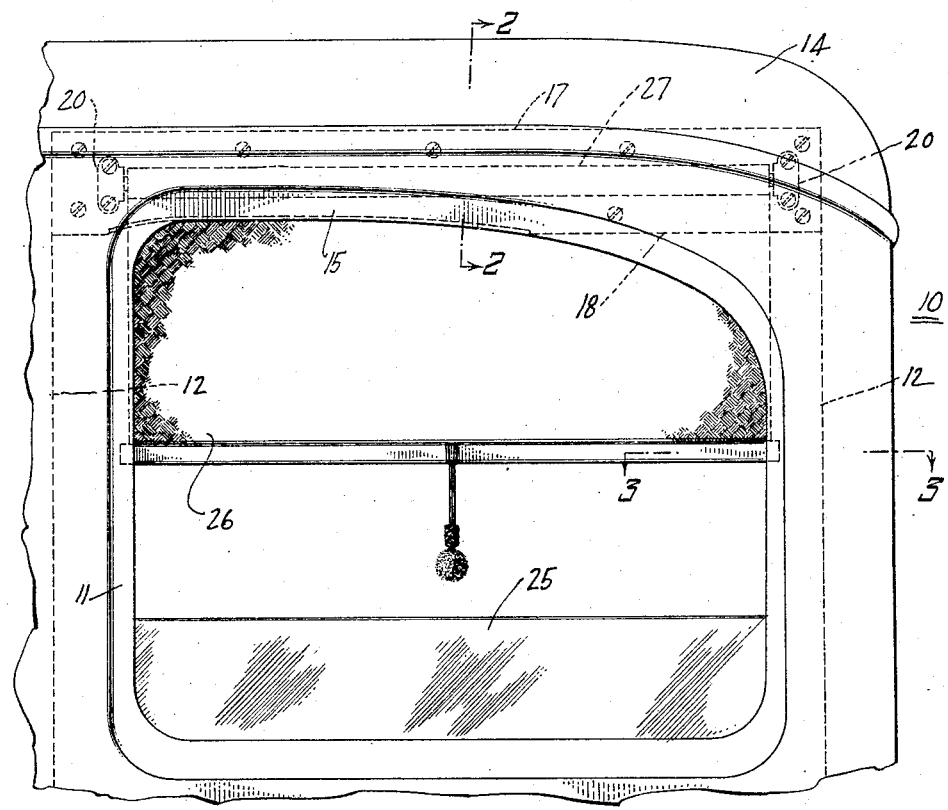
Fig. 1
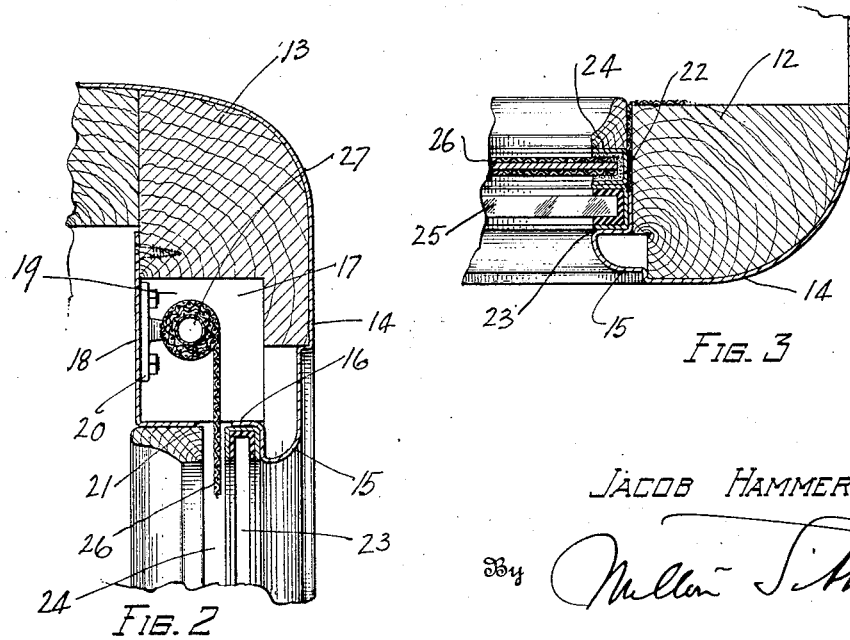
Fig. 2
Fig. 3
Inventor
JACOB HAMMERL
By
Attorney Patented Sept. 27, 1932

1,879,215

UNITED STATES PATENT OFFICE

JACOB HAMMERL, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed June 28, 1929. Serial No. 374,356.

This invention relates to motor vehicles, and more particularly to body structure.

An object of the invention is to provide a body for a motor vehicle having windows equipped with concealed shade rollers.

Another object of the invention is to provide a window shade or screen roller adapted to be concealed in the header of a motor vehicle window.

Another object of the invention is to provide a header for a window frame having a pocket adaptable for the reception of a shade or screen roller.

A further object of the invention is to provide a window frame for a motor vehicle body having a pocket in the header of the frame adaptable for the reception of a roller, and a double channel adaptable for the reception of a window glass and a shade or screen secured to the roller.

A further object of the invention is to provide a window frame for a motor vehicle body having means for concealing a shade or screen roller and means arranged in communication therewith for guiding a shade or screen attached to the roller.

Yet a further object of the invention is to provide a window frame for a motor vehicle body having an exceedingly cheap and simple means for concealing a roller and means associated therewith to guide a shade or screen attached to the roller, the guide being formed as an integral part of the guide-way for the window sash.

With these and other objects in view which may be incidental to my improvements, the invention consists in parts and combinations to be hereinafter set forth and claimed with the understanding that the several necessary elements comprising the invention may be varied in construction, proportion, and arrangement without departing from the scope of the appended claims.

Other objects of the invention will appear from the following description taken in connection with the drawing, which form a part of this specification, and in which:

Figure 1 is a side elevation and a portion of a motor vehicle body embodying the invention, Figure 2 is a sectional view taken substantially on line 2—2, Figure 1, and Figure 3 is a sectional view taken substantially on line 3—3, Figure 1.

Referring to the drawing for more specific details of the invention, 10 represents generally a motor vehicle body, having the conventional window 11. As shown, the body comprises a frame having upright members 12 shown in dotted lines in Figure 1 and in cross section in Figure 3. The upright members 12 are crowned by a top side rail 13, and are suitably spaced to provide in conjunction with the rail 13 and the sill of the window, a suitable window frame.

The frame of the window is covered by the conventional body panel 14 upon which is formed a suitable window reveal 15 having an inturned flange 16 which provides a portion of a suitable casing for the frame.

As shown, the top side rail 13 has a cutaway portion 17 over which is positioned an angle plate 18, one flange of which is in the same plane with the flange 16 on the window reveal. The plate 18 is attached to the top side rail 13 as by screws, and bolted or otherwise secured to the plate 18 are oppositely disposed brackets 20, the object of which will hereinafter appear.

The plate 18 in conjunction with the cutaway portion 17 provides a suitable housing 19 for a shade or screen roller, and the relative position of the plate 18 with respect to the flange 16 on the reveal 15 is such that a suitable slot or opening 21 for communication with the housing is provided.

Positioned on the jambs of the window are suitable guide-ways adaptable for the reception of a window glass and a shade or screen. As shown, the guide-ways comprise a single piece of metal 22 bent substantially in the form of the letter W, to provide two independent guide-ways 23 and 24, one of which—the guide 23—is adaptable for the reception of a suitable window glass 25, and the other guide-way 24 is adaptable for the reception of the edges of a shade or screen 26 secured to a suitable spring actuated roller 27 mounted for rotation on the brackets 20 secured to the angular plate. It will, of course, be understood that the guide-way 24 registers with the slot 21 in the header, and therefore has a direct communication with the housing 19 in which the shade or screen is concealed when wound upon the roller.

Although this invention has been described in connection with certain specific embodiments, the principles involved are susceptible to numerous other applications that will readily occur to persons skilled in the art. The invention is therefore to be limited only as indicated by the scope of the appended claims.

Having thus described the various features of my invention, what I claim as new and desire to secure by Letters Patent is:

1. In a motor vehicle body, in combination with a window frame, a pocket formed in the header of the frame adaptable for the reception of a shade roller, said header and frame having communicating slots therein in order that the shade may pass therethrough and a plate covering the side of the pocket adjacent the interior of the body.

2. In a motor vehicle, in combination with a window frame, a panel provided with a flanged reveal extending into the opening of the window frame, a header having a portion cut away, and a plate secured over the cut away portion to provide a housing for the reception of a shade roller extending, at the bottom of the cut-away portion, into the header and frame but spaced therefrom to constitute a slot for the shade.

3. In a motor vehicle, in combination with the body thereof, a window frame for the body, a panel provided with a reveal for the frame, a flange on the reveal extending into the opening of the frame, a housing in the header of the frame, a shade roller mounted in the housing, a shade on the roller adapted to constitute a screen, and a guide-way for the shade in the frame communicating with the housing.

4. In a motor vehicle, in combination with the body thereof, a window frame for the body, a body panel having a reveal provided with a flange adapted to fit the frame opening, a portion of the frame being cut away, a plate over the cut away portion, a housing formed by the plate and the cut away portion, said plate entirely closing the side of the housing adjacent the interior of the body, and means in the housing for supporting a shade.

5. In a motor vehicle, in combination with the body thereof, a window frame for the body, a panel on the frame having a reveal provided with a flange extending into the frame, a cut away portion on the header of the frame, an angular plate over the cut away portion providing a housing for the reception of a shade roller and a guide-way communicating with the housing through the frame.

6. In a motor vehicle body, a window frame, a glass pane slidably mounted in the frame, a housing in the header of the frame, having a roller and shade mounted therein, and a channel member on two sides of the frame adapted to form runways for both the glass pane and the shade, means enclosing the housing on all sides, said enclosing means and said frame having communicating slots therein for the shade to pass through.

In testimony whereof I affix my signature.

JACOB HAMMERL.

CERTIFICATE OF CORRECTION.

Patent No. 1,879,215.                                            September 27, 1932.

JACOB HAMMERL.

It is hereby certified that error appears in the printed specification of the above numbered patent requiring correction as follows: Page 2, line 66, claim 6, after "therein," insert the words "means enclosing the housing on all sides, said enclosing means and said frame having communicating slots therein for the shade to pass through", and line 69, beginning with the comma strike out all to and including the word "through" in line 72; and that the said Letters Patent should be read with these corrections therein that the same may conform to the record of the case in the Patent Office.

Signed and sealed this 11th day of April, A. D. 1933.

(Seal)

M. J. Moore.
Acting Commissioner of Patents.